United States Patent
Manwiller et al.

(10) Patent No.: US 12,137,090 B1
(45) Date of Patent: *Nov. 5, 2024

(54) SECURED AUTOMATIC USER LOG-IN AT WEBSITE VIA PERSONAL ELECTRONIC DEVICE

(71) Applicant: WALGREEN CO., Deerfield, IL (US)

(72) Inventors: Peter Manwiller, Chicago, IL (US); Lindsey Whitaker, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/738,749

(22) Filed: May 6, 2022

Related U.S. Application Data (63) Continuation of application No. 16/935,975, filed on Jul. 22, 2020, now Pat. No. 11,349,825, which is a continuation of application No. 15/406,152, filed on Jan. 13, 2017, now Pat. No. 10,764,272.

(51) Int. Cl.
  *H04L 9/40* (2022.01)
  *H04W 12/06* (2021.01)
  *H04W 12/08* (2021.01)

(52) U.S. Cl.
  CPC ...... *H04L 63/0815* (2013.01); *H04L 63/0876* (2013.01); *H04L 63/102* (2013.01); *H04W 12/06* (2013.01); *H04W 12/08* (2013.01)

(58) Field of Classification Search
  CPC ............ H04L 63/0815; H04L 63/0876; H04L 63/102; H04L 63/0807; H04L 67/02; H04L 67/535; H04W 12/06; H04W 12/08; G06F 21/34; G06F 16/972
  See application file for complete search history.

(56) References Cited

U.S. PATENT DOCUMENTS

| | | |
|---|---|---|
| 2007/0169189 A1 | 7/2007 | Crespo et al. |
| 2008/0086484 A1 | 4/2008 | Darnell et al. |
| 2010/0017889 A1 | 1/2010 | Newstadt et al. |
| 2012/0084210 A1 | 4/2012 | Farahmand |
| 2013/0042110 A1 | 2/2013 | Shablygin et al. |
| 2013/0305335 A1 | 11/2013 | Syed et al. |
| 2013/0312075 A1 | 11/2013 | Nichols et al. |
| 2014/0075513 A1 | 3/2014 | Trammel et al. |
| 2015/0248552 A1 | 9/2015 | El Khoury et al. |
| 2016/0021233 A1 | 1/2016 | Savage et al. |
| 2016/0105290 A1 | 4/2016 | Khalil et al. |

(Continued)

*Primary Examiner* — Brian F Shaw
(74) *Attorney, Agent, or Firm* — MARSHALL, GERSTEIN & BORUN LLP; Randall G. Rueth (57) ABSTRACT

Techniques for providing secured, automatic log-in and authentication of a user to a website via a browser executing at the user's personal electronic device (PED) include generating a token based on an identifier of the PED and a user identifier, and storing the token at the user's PED for use in validating and authenticating the user and device credentials against those stored at back-end system and/or in another memory location at the device. Based on the persisted token (and optionally on a user preference), the user may be automatically logged in as the user navigates across restricted and unrestricted portions of the website, and/or to other websites (e.g., without the user's knowledge). At least these features enable automatic log-in and authentication to be performed on an as-needed basis, and/or on a per-device basis, thereby providing significantly more secure access as compared to known techniques.

20 Claims, 7 Drawing Sheets

(56) References Cited

U.S. PATENT DOCUMENTS

| | | |
|---|---|---|
| 2016/0119323 A1 | 4/2016 | Krishna |
| 2016/0171202 A1 | 6/2016 | Goad |
| 2017/0085563 A1 | 3/2017 | Royyuru |
| 2018/0083959 A1 | 3/2018 | Barbosa et al. |

SECURED AUTOMATIC USER LOG-IN AT WEBSITE VIA PERSONAL ELECTRONIC DEVICE

CROSS-REFERENCE TO RELATED APPLICATIONS

The present application is a continuation of U.S. patent application Ser. No. 16/935,975 entitled "SECURED AUTOMATIC USER LOG-IN AT WEBSITE VIA PERSONAL ELECTRONIC DEVICE" and filed on Jul. 22, 2020, which is a continuation of U.S. patent application Ser. No. 15/406,152 entitled "SECURED AUTOMATIC USER LOG-IN AT WEBSITE VIA PERSONAL ELECTRONIC DEVICE" and filed on Jan. 13, 2017, the disclosures of which are hereby incorporated by reference herein in their entireties.

TECHNICAL FIELD

This application generally relates to providing secured, automatic user log-in and authentication at a website via the user's personal electronic device.

BACKGROUND

Some websites provided by enterprises (e.g., retailers, insurance providers, financial institutions, educational institutions, etc.) include one or more restricted portions that require a user to provide login credentials and be authorized before the user is able to gain or obtain access thereto. Examples of restricted portions of websites include payment pages, account information and history, records, and the like. Typically, a user is prompted to provide a login or user name and credentials such as a password, passphrase, biometric information, etc. in order to be authenticated and granted access to restricted portions or, for some websites, to the entirety of the website itself.

Multiple, explicit user log-in requests from a website can be cumbersome and detract from the user's experience. To address this issue, some websites cause a cookie or other data storage entity to be stored at a user's personal electronic device (PED), e.g., in conjunction with a web browser at the user's PED. The cookie typically stores the user's login/username, credentials, and/or other identifying information which are automatically provided to the website so that the user does not need to repeat explicitly providing his or her login and credentials, thereby perpetually maintaining the logged-in state of the user at the website until, for example, the user takes steps to explicitly delete the cookie.

This approach, while convenient for the user, exposes significant security risks. For example, as long as the cookie exists on the user's PED, anyone who utilizes the user's PED has automatic access to the website and to the user's account via the browser under the user's credentials stored in the cookie, and therefore is able to make unauthorized purchases or financial transactions, view the user's personal records, manipulate personal data of the user, and the like.

SUMMARY

The novel systems, methods, and techniques disclosed herein provide secured, automatic user log-in and authentication at a website via a browser executing at a user's personal electronic device (PED). The novel systems, methods, and techniques disclosed herein enable a user to be automatically logged in/authenticated when the user navigates to restricted portion of the website. Additionally, increased security over known techniques is provided, as the novel systems, methods, and techniques disclosed herein do not merely rely on providing the stored username and credentials for log-in and authentication. Instead, verification of additional information such as device identification, user identification, etc. is automatically performed to provide additional layers of security.

Further, the novel systems, methods, and techniques may provide secured, automatic user log-in and authentication for a particular user at a website across multiple devices. For example, the user may be provided with secured, automatic log-in and authentication at a website via multiple different personal electronic devices, and the user is provided the ability to manage his or her automatic, secured access to the website across the multiple devices, such as by particularly turning the automatic access feature on and off at various devices as desired, e.g., at the device itself, or via a remote device.

In an embodiment, a method for automatically providing access to one or more restricted portions of a website to a user operating a personal electronic device (e.g., a mobile device) is disclosed. The method may include receiving an indication of the user navigating, via a browser executing on the personal electronic device, to a target destination that is included on the website and to which access is restricted. The method may also include, based upon the received indication, automatically determining whether or not a token corresponding to automatic access to restricted portions of the website is stored at the personal electronic device. When the token is determined to be stored at the personal electronic device, the method may include accessing, based on a user identifier indicated by the token, a user profile stored at a back-end system corresponding to the website, and comparing a device identifier indicated by the token with a device identifier indicated by the user profile. When the device identifier indicated by the token corresponds to the device identifier indicated by the user profile, the method may include automatically providing or granting the user access to the one or more restricted portions of the website, the one or more restricted portions of the website including the target destination. On the other hand, when at least one of: (i) the token is determined to be not stored at the personal electronic device, or (ii) the device identifier indicated by the token does not correspond to the device identifier indicated by the user profile, the method may include requesting the user to log-in via a user interface of the personal electronic device in order to access the target destination included on the website.

In an embodiment, a system for automatically providing access to a website via a personal electronic device (e.g., a mobile device) operated by a user is disclosed. The system may include a website hosted at a back-end system. The website may be accessed by the user of the personal electronic device via a browser executing on the personal electronic device, and may include a restricted portion and an unrestricted portion. The system may also include a database or data store that stores a plurality of profiles of a plurality of users of the website, where each user profile is indicated by a respective user identifier. Additionally, the system may include computer-executable instructions stored on one or more memories of the back-end system that, when executed by one or more processors of the back-end system, cause the system to determine, upon receiving an indication of the user navigating via the browser executing on the personal electronic device to the restricted portion of the website, whether or not a token corresponding to automatically accessing the restricted portion of the website is stored at the personal electronic device. When the token is determined to be stored at the personal electronic device, the computer-executable instructions may cause the system to access a user profile stored in the database to determine a device identifier stored in conjunction with the user profile, where the user profile corresponds to a user identifier indicated by the token stored at the personal electronic device, and determine whether or not the device identifier stored in conjunction with the user profile corresponds to a device identifier indicated by the token stored at the personal electronic device. When the device identifier stored in conjunction with the user profile corresponds to the device identifier indicated by the token, the computer-executable instructions may cause the system to automatically grant access of the user to the restricted portion of the website, including automatically logging in the user to the restricted portion of the website. When the device identifier stored in conjunction with the user profile does not correspond to the device identifier of the personal electronic device indicated by the token, the computer-executable instructions may cause the system to provide, at a user interface of the personal electronic device, a request to enter authentication credentials in order to access the restricted portion of the website.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

The systems, methods, and techniques disclosed herein relate to providing security, automatic log-in and/or authentication of a user to access one or more portions of a website to which access is restricted via a browser executing on a particular Personal Electronic Device ("PED") operated by the user. In an embodiment, after a user has indicated his or her preference for turning on or opting into a feature that provides automatic log-in/authentication to the one or more restricted portions of the website at the particular PED, and after the user's credentials have been initially verified, the user does not need to re-enter any credentials to access the one or more restricted portions of the website via the browser operating on the particular PED until the user turns off or ops out of the feature. In an embodiment, the systems, methods and techniques disclosed herein provide secured, automatic log-in and/or authentication when a user navigates, via a browser operating on the particular PED, to a restricted portion or destination at a website, thereby not only providing convenience to the user but also providing additional security to protect access and information that is viewed, added, and/or modified at restricted portions of the website. Further, the user is provided with the ability to indicate the specific personal electronic devices on which the user desires the automatic access feature to be activated and/or de-activated, e.g., via any personal electronic device or computer.

Figure 1A:
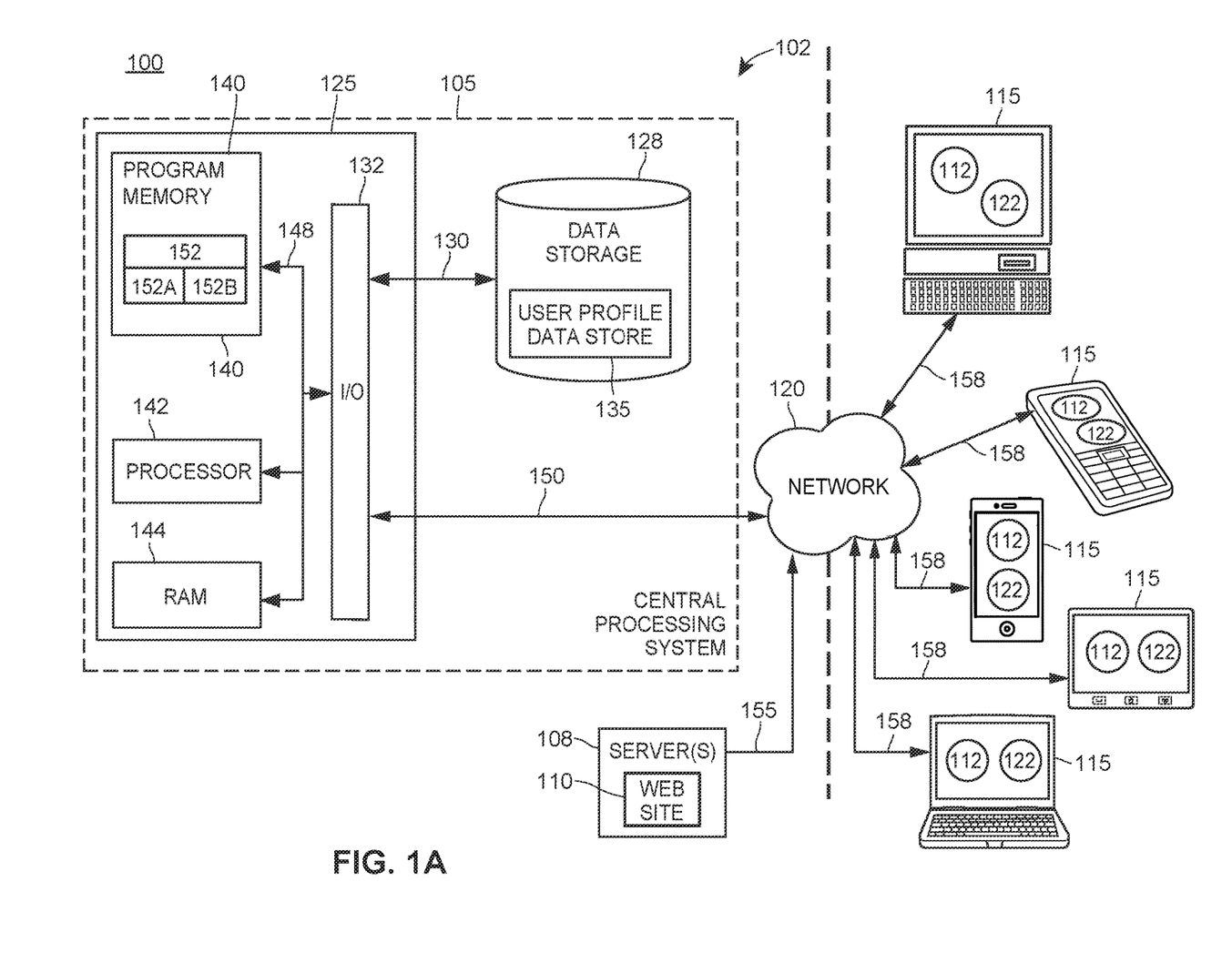
FIG. 1A depicts an embodiment of a system for automatic log-in and/or authentication of users, e.g. to one or more restricted portions of an enterprise website.

FIG. 1A illustrates an overall system 100 including various components configured to implement various embodiments for security, automatic authentication and logging in of users to access one or more portions of a website to which access is restricted, e.g., via browsers executing on the users' PEDs. The system 100 may include a combination of hardware, firmware, and software components, as well as various data communication channels for communicating data between and among the various hardware, firmware, and software components. The system 100 may be owned and/or operated by an enterprise or organization, such as a pharmacy, a healthcare provider, a workplace benefits administrator, an investment company, an insurance provider, an educational institution, a library, a governmental records organization, a non-profit organization, a retailer, or any other type of enterprise or organization.

The system 100 may include a set of back-end components 102 (which are referred to interchangeably herein as the "back-end system 102") which may include a central processing system 105 and one or more servers 108. The one or more servers 108 may be implemented, for example, by a bank of servers, a cloud computing system, one or more networked computing devices, or any other suitable arrangement of one or more computing devices. At least one of the servers 108 may host a website 110 of the enterprise. The enterprise website 110 may be accessed and navigated by a user via a browser 112 (e.g., a web browser 112) executing on a personal electronic device or PED 115 operated by the user, e.g., a personal computer, a cellular phone, a smart device, a mobile communications device, a tablet, a laptop, another type of handheld electronic device, a desktop computer, etc. For ease of discussion, the PED 115 is referred to interchangeably herein as a "mobile device 115" or a "client device 115," however, the techniques are equally applicable to any type of PED 115 operated by a user irrespective of whether or not the PED 115 is mobile. It is noted that, in some implementations, an enterprise may choose to apply the systems, methods, and techniques described herein to only certain types of PEDs 115 (e.g., to only mobile devices and not stationary devices; to only smart devices and smart phones but not tablets or laptops, etc.), however, these types of implementations are at the discretion of each enterprise as, generally speaking, the systems, methods, and techniques disclosed herein are equally applicable to any type of PED 115.

At any rate, the enterprise website 110 may include one or more restricted portions or destinations via which a user's credentials must be first verified and/or authenticated (e.g., by logging in with a user login, password, passphrase, passcode, answers to security questions, biometrics, etc.), before the user is allowed to gain or obtain access thereto. Examples of such restricted portions/destinations may include a portion via which payment information is entered and verified (and optionally stored); a portion via which account information of the user is entered, viewed, and/or modified; a portion via which personal information of the user is entered, viewed, and/or modified (e.g., contact information for the user, prescription information, benefits information, claims information, health records, payment formats, financial account information, and the like), and/or other portions corresponding to other information that the user may desire to keep private and/or secured. For some enterprises, the entirety of the website 110 may be subject to restricted access. For some enterprises, the website 110 may include one or more portions/destinations to which access is restricted as well as one or more other portions/destinations to which access is unrestricted, for example, portions that provide the contact information of the enterprise, descriptions of products and/or services that are for sale or otherwise available, various policies of the enterprise, FAQs, and the like.

The browser 112 executing on a PED 115 may be a vehicle or mechanism via which the user attempts to access and navigate to the website 110 and to various destinations therein, e.g., a web browser. A communicative connection or link 158 between the web browser 112 and the website 110 (and/or between the web browser 112 and one or more other back end components 102) may be established through one or more digital networks 120. The digital network(s) 120 may include a proprietary network, a secure public Internet, a virtual private network, and/or some other type of network, such as dedicated access lines, plain ordinary telephone lines, satellite links, wireless links, wired links, combinations of these, etc. Where the digital network 120 comprises the Internet or other IP-based communication network, data communication may take place over the digital network 120 via a protocol of the Internet protocol suite (e.g., TCP/IP, UDP, SCTP, various application layer protocols, etc.). Generally speaking, the communicative connection or link 158 that is established between the browser 115 and the website 110 may be implemented by using any known communication technique, such as by establishing sessions therebetween, tunneling, circuit-switching, virtual circuit switching, etc.

It is noted that, for some enterprises, an enterprise-specific application 122 may also execute on PED 115 in addition to the web browser 112. An enterprise-specific application 122 may be, for example, a client application that is provided by the enterprise and that has been downloaded onto a user's PED 115. However, the presence of an enterprise-specific application 122 on the PED 115 notwithstanding, the techniques described herein generally apply to accessing and navigating the enterprise website 110 via the browser 112 executing at the PED 115, and not to user access via the enterprise-specific application 122 executing at the PED 115.

The central processing system 105 may include a controller 125 operatively connected to one or more databases 128 via a link 130 connected to an input/output (I/O) circuit 132. The one or more databases 128 may comprise one or more data storage devices that are adapted to store data related to the operation of the system 100. It should be appreciated that although the database(s) 128 is shown as a single entity in FIG. 1A, the database 128 may be implemented using any one or more databases and any one or more data storage devices. For example, the database(s) 128 may be implemented by a data bank or a data cloud. It should be noted that, while not shown, additional databases may be linked to the controller 125 in a known manner.

The databases(s) 128 may include a user profile data store 135. The user profile data store 135 may include a plurality of profiles of a plurality of users associated with the enterprise, e.g., customers, clients, registered users, etc. Each user profile may be associated with a particular user, and may be uniquely identified within the system 100 by a respective enterprise user identifier. Typically, an enterprise user identifier is different than a user's login or username. For example, an enterprise user identifier may comprise a set of alphanumeric and/or other types of characters that are assigned by the enterprise to uniquely identify a particular user to the enterprise, whether at the website or in other databases and/or locations operated by the enterprise.

Each user profile may store data corresponding to its respective user, such as his or her login credentials (e.g., user login name, password, passphrase, passcode, answers to security questions, biometric data, etc.), contact information (e.g., address, phone numbers, email addresses, etc.), account information, user preferences, purchase history, return history, claim history, stored payment options, prescriptions that have been ordered and filled, and/or other similar information indicative of transactions and/or interactions between the respective user and the enterprise, e.g., that have taken place via the enterprise website 110 and via other means.

The central processing system 105 may access the data stored in the database(s) 128 when executing various functions and tasks associated with the operation of the system 100. The central processing system 105 may also maintain and update the data stored in the database(s) 128 and in the user profile data store 135. For example, the central processing system 105 may place orders, update passwords, user preferences, and default payment methods for various users, etc. e.g., upon notification of such activities received via the enterprise website 110.

The controller 125 of the central processing system 105 may include a program memory 140, a processor 142 (which may be called a microcontroller or a microprocessor), a random-access memory (RAM) 144, and the input/output (I/O) circuit 132, all of which may be interconnected via an address/data bus 148. It should be appreciated that although only one microprocessor 142 is shown, the controller 125 may include multiple microprocessors 142. Similarly, the memory of the controller 125 may include multiple RAMs 144 and multiple program memories 140. The RAM(s) 144 and the program memories 140 may be implemented as semiconductor memories, magnetically readable memories, biological memories, and/or optically readable memories, for example. A link 150 may operatively connect the controller 125 to the digital network 120 through the I/O circuit 132, for example. Although the I/O circuit 132 is shown as a single block, it should be appreciated that the I/O circuit 132 may include a number of different types of I/O circuits.

The program memory 140 may also contain or be configured with machine- or computer-readable or computer-executable instructions (e.g., software) 152, for execution by the processor 142. The software 152 may perform the various tasks associated with operation of the enterprise, and may be a single module 152 or a plurality of modules 152A, 152B. While the software 152 is depicted in FIG. 1A as including two modules, i.e., 152A and 152B, the software 152 may include any number of modules accomplishing tasks related to enterprise operation. For example, the software 152 may comprise one or more sets of computer-executable instructions that, when executed by the processor 142, cause the system 105 to execute at least a portion of any of the methods described herein, such as the method 300, the method 350, and/or the method 400.

Further, although FIG. 1A illustrates the central processing system 105 as including only one controller 125, it is understood that this is for ease of illustration and is not meant to be limiting. Indeed, in some embodiments of the system 100, the central processing system 105 may be implemented using multiple controllers 125 that have a unitary or integral logical appearance. For example, the central processing system 105 may be implemented as a bank of servers or on a computing cloud.

Still further, it will be appreciated that although only one server 108 is depicted in FIG. 1A, multiple servers 108 may be provided for the purpose of distributing server load, serving different web pages, implementing different portions of an electronic web interface, servicing different enterprise client applications, etc. In addition to the server 108 hosting the enterprise website 110, these multiple servers 108 may include an entity-specific server (e.g. an Apple® server, etc.), a server that is disposed in a retail or proprietary network, an independent third-party server that is not under the control of the entity, etc. Similar to the central processing system 105, the one or more servers 108 may be implemented in any suitable manner, e.g., by a bank of servers, a cloud computing platform, etc. A link 155 may operatively connect the one or more servers 108 to the digital network 120, for example.

Figure 1B:
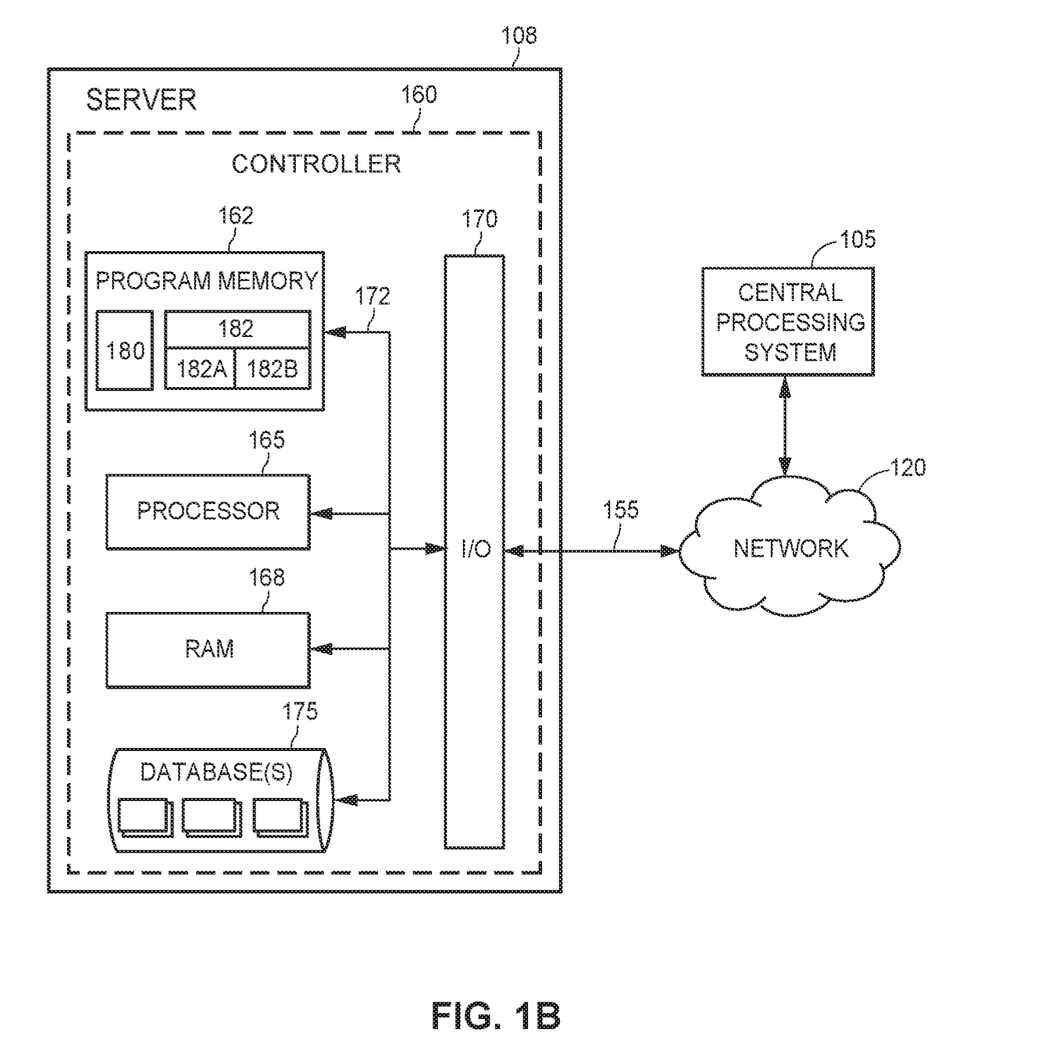
FIG. 1B depicts an embodiment of a server included in the system of FIG. 1A.

Turning now to FIG. 1B, the server 108, like the central processing system 105, may include a controller 160. Similar to the controller 125 of the central processing system 105, the controller 160 of the server 108 may include a program memory 162, a microcontroller or a microprocessor (MP) 165, a random-access memory (RAM) 168, and an input/output (I/O) circuit 170, all of which may be interconnected via an address/data bus 172. In some embodiments, the controller 160 may also include, or otherwise be communicatively connected to, a database 175 or other data storage mechanism (e.g., one or more hard disk drives, optical storage drives, solid state storage devices, etc.). The database 175 may include data such as user profiles, product data, mobile device application data, web page templates and/or web pages, and other data that may be used to interact with users via the network 120. According to embodiments, the database 175 may store at least some of the same or similar data as that stored by the database 128 as discussed with respect to FIG. 1A. For example, the database 175 may include at least a portion of the user profile data store 135. Further, the database 175 may be implemented on one or more data storage devices.

As discussed with reference to the controller 125 of the central processing system 105, it should be appreciated that although FIG. 1B depicts only one controller 160, in some embodiments, the server 108 may include multiple controllers 160. Similarly, although FIG. 1B depicts only one microprocessor 165, the controller 160 may include multiple microprocessors 165. In some embodiments, the memory of the controller 160 may include multiple RAMs 168 and multiple program memories 162. The controller 160 may implement the RAM(s) 168 and the program memories 162 as semiconductor memories, magnetically readable memories, biological memories, and/or optically readable memories, for example. Further, although the FIG. 1B depicts the I/O circuit 170 as a single block, the I/O circuit 170 may include a number of different types of I/O circuits.

Still further, in addition to the server 108 being connected via the link 155 through the network 120 to the personal electronic or client devices 115 as shown in FIG. 1A, FIGS. 1A and 1B illustrate that the server 108 may also be connected via the link 155 through the network 120 to the central processing system 105. As such, the communicative connection of the server 108 to the central processing system 105 may assist in facilitating various functionalities. For example, the server 108 may act as a routing or interfacing server between the plurality of client devices 115 and a destination server, namely, the central processing system 105. The server 108 may be configured to communicate with the central processing system 105 and with the client devices 115 via a multitude of suitable protocols, such as packet-switched protocols, web services, web APIs (Application Programming Interface), etc. The server 108 may also convert (if necessary) and route client application data (not shown) to the appropriate server, such as to the central process system 105, for example. Additionally, the server 108 may act as the destination server and need not route any data from an internet-enabled device 115.

As shown in FIG. 1B, the program memory 162 and/or the RAM 168 may store various applications for execution by the microprocessor 165. For example, a user-interface application 180 may provide a user interface to the server 108, where the user interface may, for example, enable a network administrator to configure, troubleshoot, or test various aspects of the server's operation, or otherwise to access information thereon. One or more server applications 182 may operate to populate and transmit client application data and web pages to the client devices 115, receive information from the user transmitted back to the server 108, and forward appropriate data to the central processing system 105. In an embodiment, the one or more server applications 182 include the enterprise website 110 hosted at the server 108.

Similar to the software 152 of FIG. 1A, the server application 182 may be implemented by a single module 182 or by a plurality of modules 182A, 182B. While the server application 182 is depicted in FIG. 1B as including two modules, i.e., 182A and 182B, the server application 182 may include any number of modules that may facilitate tasks related to the implementation of the server 108. By way of example, the module 182A may populate and transmit the client application data and/or may receive and evaluate inputs from the user to receive a data access request, while the module 182B may communicate with one or more of the back end components 102 to fulfill a data access request.

Figure 1C:
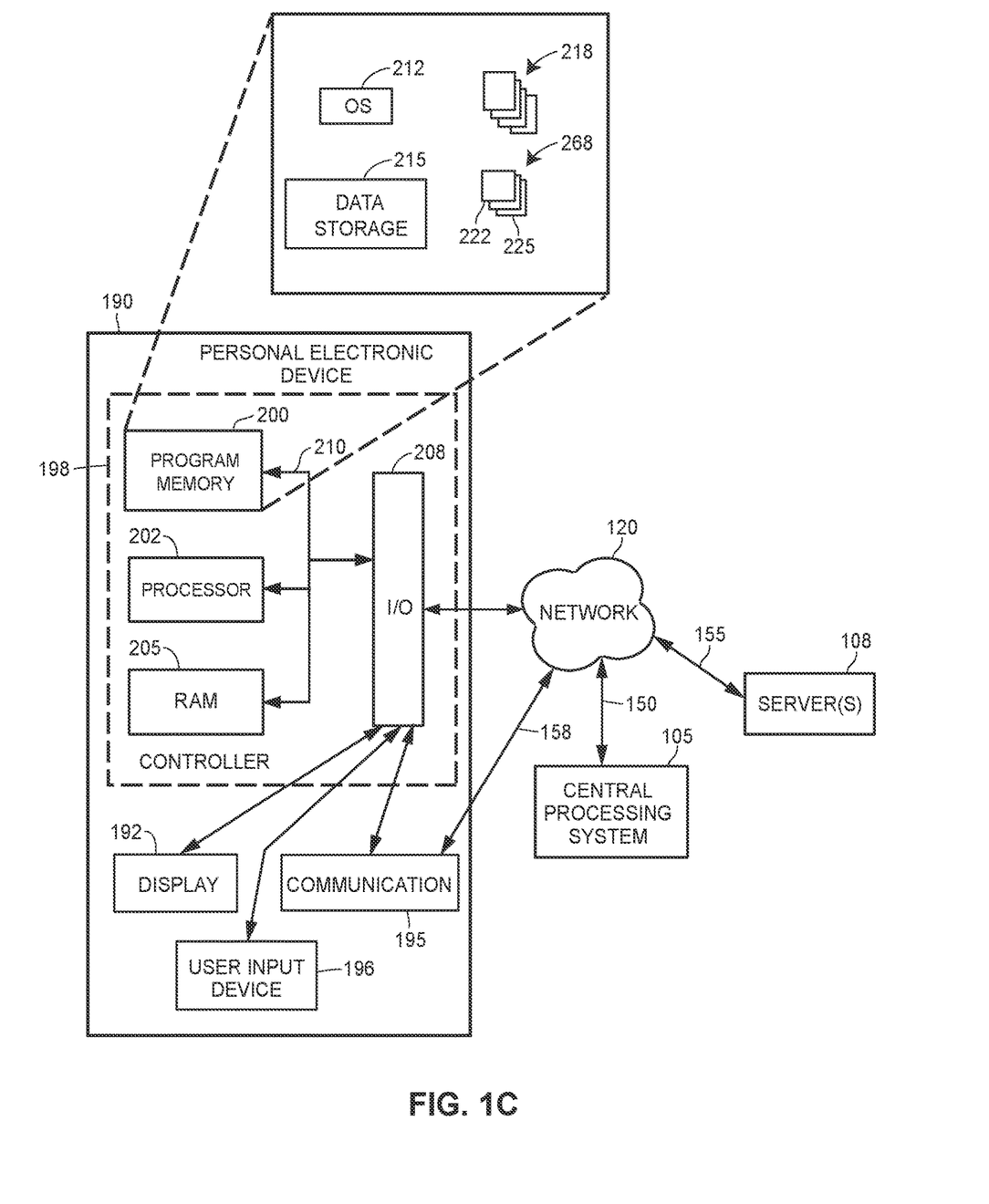
FIG. 1C depicts an embodiment of a personal electronic device via which a user may access the enterprise website of FIG. 1A.

Referring now to FIG. 1C, the personal electronic device 190 (which may be any of the PEDs 115 shown in FIG. 1A) may include a display 192, a communication unit 195 (which may include respective one or more interfaces and/or transceivers to support the link 158, at least some of which may be wireless), a user-input device 196, and, like the server 108, a controller 198. Similar to the controllers 125 and 160, the controller 198 includes a program memory 200, one or more microcontrollers or microprocessors (MP) 202, a random-access memory (RAM) 205, and an input/output (I/O) circuit 208, all of which may be interconnected via an address/data bus 210. In some embodiments, the controller 198 may also include, or otherwise be communicatively connected to, other data storage mechanisms (e.g., one or more hard disk drives, optical storage drives, solid state storage devices, etc.) that may reside within the personal electronic device 190. In some embodiments, the controller 198 may be communicatively connected to the display 192, the communication unit 195, and the user input device (or generally, a user interface) 196 via the I/O circuit 208.

As shown in FIG. 1C, the program memory 200 may include an operating system 212, a data storage 215, a plurality of software applications 218, and a plurality of software routines 220. The operating system 210, for example, may include one of a plurality of mobile platforms such iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. For PEDs 190 that are not mobile, the operating system 210 may include one of a plurality of desktop operating systems, such as Microsoft Windows, Apple OS X, Linux, etc. The data storage 215 may include data such as user profiles, application data for the plurality of applications 218, routine data for the plurality of routines 220, and other data necessary to interact with the server 108 and/or any of the back-end components 105 through the digital network 120.

The communication unit or module 195 may communicate with the server 108 and other devices via one or more transceivers that support any one or more suitable wired and/or wireless communication protocol network or networks, such as wired Ethernet, a wireless cellular telephony network (e.g., GSM, CDMA, LTE, etc.), a WLAN network (or other similar network according to 802.11 standards), a WiMAX network, a short-range wireless communication network (e.g., Bluetooth, Zigbee, infrared, etc.), and/or others. The user input device 196 may include a "soft" keyboard that is displayed on the display 192 of the personal electronic device 190, an external hardware keyboard communicating via a wired or a wireless connection (e.g., a Bluetooth keyboard), an external mouse, a microphone, speaker, and/or other audio I/O interfaces, or any other suitable user-input device. The user interface 196 (which may include the display 192) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In embodiments, the display 192 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

As discussed with reference to the controllers 125 and 160, it should be appreciated that although FIG. 1C depicts only one controller 198, the PED 190 may include multiple controllers 198, in an embodiment. Similarly, although FIG. 1C depicts only one microprocessor 202, in some configurations the controller 198 may include multiple microprocessors 202. In some configurations, the memory of the controller 202 may include multiple RAMs 205 and multiple program memories 200. The controller 198 may implement the RAM(s) 205 and the program memories 200 as semiconductor memories, magnetically readable memories, biological memories, and/or optically readable memories, for example. Further, although the FIG. 1C depicts the I/O circuit 208 as a single block, the I/O circuit 208 may include a number of different types of I/O circuits.

The one or more processors 202 of the PED 190 may be adapted and configured to execute any one or more of the plurality of software applications 218 and/or any one or more of the plurality of software routines 220 residing in the program memory 200, in addition to other software applications. One of the plurality of applications 218 may be an enterprise-specific client application 222 that is provided by the enterprise, has been downloaded to the personal electronic device 190, and allows the user to interact with the enterprise. For example, the client application 222 may be the enterprise-specific application 122 shown in FIG. 1A. The client application 222 may be implemented as a series of machine- or computer-readable instructions for performing the various tasks associated with receiving information at, displaying information on, and transmitting information from the personal electronic device 190 with respect to interactions with the enterprise.

Additionally, one of the plurality of applications 220 may be a native or downloaded browser 225. For example, for PEDs 190 that are mobile devices, the browser 225 may be Apple's Safari®, Google Android™ mobile web browser, Microsoft Internet Explorer® for Mobile, Opera Mobile™, etc. For PEDs 190 that are not mobile devices, the browser 225 may be, for example, Microsoft Internet Explorer, Google Chrome, Mozilla Firefox, Opera, Vivaldi, Maxthon Cloud Browser, etc. Generally speaking, the browser 225 may be implemented as a series of machine- or computer-readable instructions for receiving, interpreting, and displaying web page information from the server 108 while also receiving inputs from the user.

In general, a computer program product in accordance with an embodiment includes a computer usable storage medium (e.g., standard random access memory (RAM), an optical disc, a universal serial bus (USB) drive, or the like) having computer-readable program code or instructions embodied or stored therein (which is interchangeably referred to herein as "machine-readable" or "computer-executable" code or instructions). The computer-readable program code is adapted to be executed by the processor 202 (e.g., working in connection with the operating system 212) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 2:
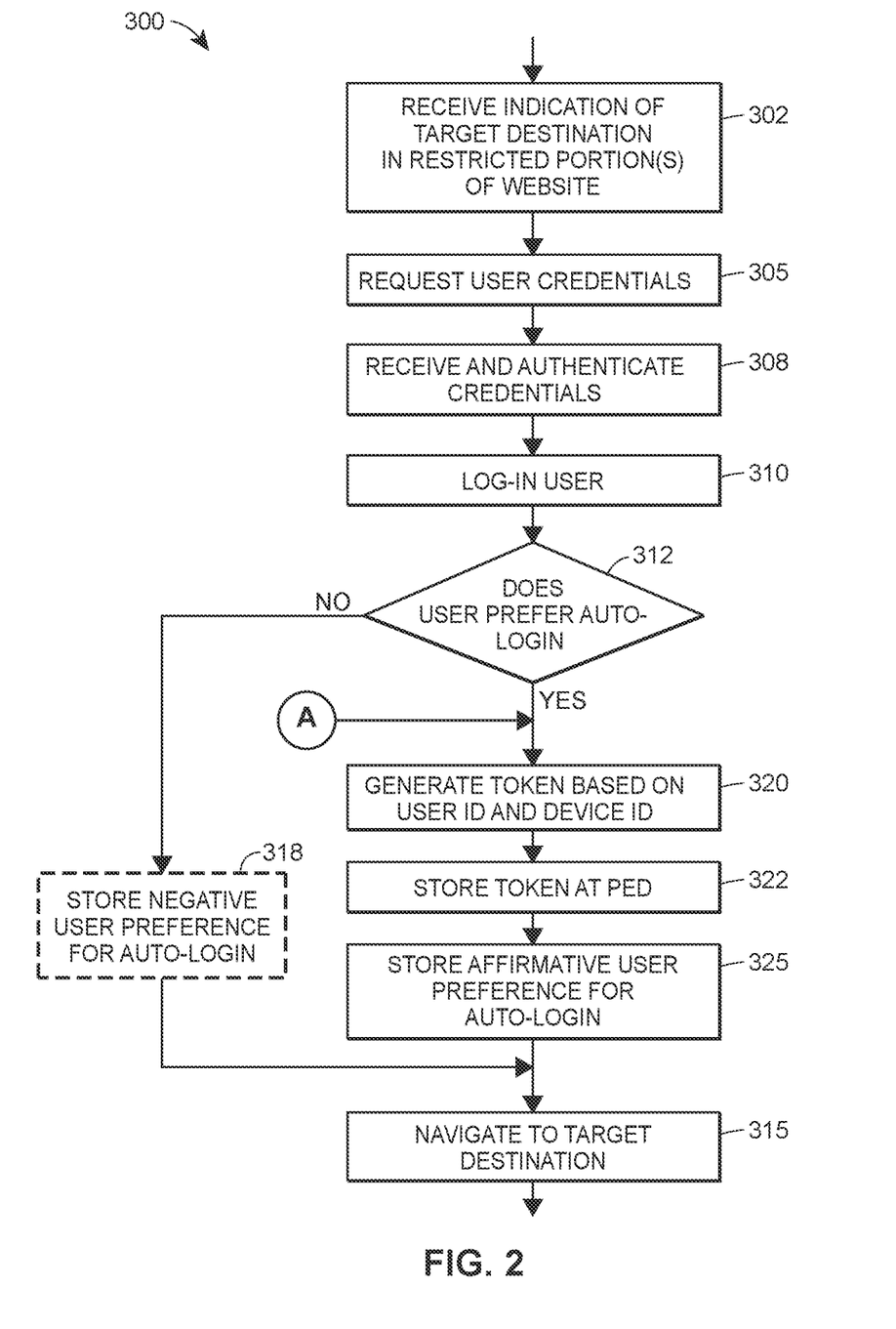
FIG. 2 includes a flow chart of an example method for establishing automatic log-in and/or authentication of a user to a website or to restricted portion(s) thereof.

FIG. 2 depicts a flow chart of an example method 300 for establishing the automatic log-in and/or authentication of a user to a website, or to one or more restricted portions thereof. The method 300 may operate in conjunction with embodiments of the system 100 of FIG. 1A and any one or more components related thereto, such as the central processing system 105, the server 108, the database(s) 128, the PED 115 or 190, etc., and/or may operate in conjunction with other systems, processors, databases and/or devices. For ease of discussion, though, and not for limitation purposes, the method 300 is discussed with simultaneous reference to FIGS. 1A-1C.

In an example scenario in which the method 300 is utilized, as an initial condition, a user of a PED 190 has not yet indicated a preference as to whether he or she desires to "opt-in" or turn on automatic log-in and authentication via the PED to restricted portions of a website 110 that is provided by an enterprise. Accordingly, in this scenario, at a block 302, the method 300 includes receiving an indication of the user desiring to navigate to a destination included on an enterprise website that requires the user to log on and be authenticated before access thereto is granted. For example, the indication may be received at the one or more servers 108 hosting the enterprise website 110 via the communicative connection that is established between a browser 112 executing on a personal electronic device 115 operated by a user and the enterprise website 110 (e.g., via the network 120 and the links 155, 158), such as in a manner previously discussed above. The destination that is desired to be accessed by the user and that requires authentication may be the enterprise website 110 itself in its entirety, or the destination may be a portion of the enterprise website 110 to which access is granted only after a user is logged in and authenticated/verified, e.g., a portion in which payments are received and processed, a portion in which claims or transactions are listed, etc.

Upon receiving the indication (block 302), the method 300 may include requesting the user's credentials (block 305), e.g., by presenting one or more fields on the display 192 of the user's PED 190 via which the user may enter his or her credentials (e.g., username, password, passphrase, security question answers, etc.), and/or by directing the user to enter his or her credentials via another interface of the PED 190 (e.g., biometric information via a sensor included on the PED 190). The credentials may be received and authenticated and/or verified (block 308), e.g., by comparing the entered credentials with those of the user that are stored in the user profile data store 135. Upon successful authentication/verification, the user is logged in and authorized to access the restricted destination of the website 110 (block 310). As such, with blocks 305-310, the user is manually logged-in and authenticated, as the user has explicitly and manually provided his or her authorization credentials in order to login, authenticate, and gain access.

In this example scenario, as the user has not yet indicated a preference as to whether he or she desires to "opt-in" or "turn on" automatic log-in and authentication at the PED 190, block 312 of the method 300 may include querying the user, e.g., via the display 192 of the PED 190, as to whether or not the user desires to opt-in, turn on, or otherwise activate automatic log-in and authentication at the website 110. If the user does not desire to opt-in, turn on, or otherwise activate automatic log-in and authentication, the method 300 may proceed from the block 312 to the block 315 at which the user is navigated to his or her target destination. In some embodiments, at an optional block 318, an indication of the negative preference of the user with regard to automatic log-in/authentication may be stored in conjunction with the user's profile in the user profile data store 135.

On the other hand, at the block 312, if the user indicates that he or she desires to activate automatic log-in and authentication, the method 300 may include generating a token indicative of the user's affirmative preference for automatic log-in and authentication (block 320). Generally speaking, the token (or information indicated therein) may store data or information that allows the user to automatically access restricted portions of the website 110 (which, in some scenarios, may include the entire website 110) via the browser 112 executing at the PED 190 without the user having to manually or explicitly provide a login, password, or any other credentials. In an embodiment, the token is generated based on a user identifier ("User ID") and a device identifier ("Device ID"). For example, the User ID and the Device ID (or respective indicators thereof, such as pointers or other types of indicators) may be concatenated within the token. In an embodiment, the token may be implemented as or in a cookie or other suitable memory area or location associated with the browser 112.

The User ID may be (or may be generated from) the enterprise user identifier that corresponds to the user and that is used by the system 100 to uniquely identify the user within the system 100, e.g., the unique user identifier associated with the user's profile stored in the user profile data store 135 and via which the user is identified to the enterprise systems. For example, the User ID may comprise at least portions of the enterprise user identifier or a pointer or other associative indicator thereto, or the User ID may be generated by applying an algorithm to the enterprise user identifier, e.g., to limit a total number of bits and/or to provide additional security.

The Device ID may uniquely identify, within the system 100, the particular PED 190 operated by the user. In an embodiment, the Device ID may be generated from a physical identifier of the PED 190, such as the ESN (Electronic Serial Number), IMEI (International Mobile Equipment Identity), MEID (Mobile Equipment Identifier), the make/model/serial number, and/or another suitable identifier of the physical PED 190. Additionally or alternatively, the Device ID may be generated from a logical and/or temporal identifier associated with the PED 190, such as a phone number, a UUID (Universally Unique Identifier), a GUID (Globally Unique Identifier), a MAC (Media Access Control) address, an IP (Internet Protocol) address, another type of communication address, or other suitable logical/temporal identifier. Still additionally or alternatively, a Device ID may be generated based on data that is provided/stored natively at the PED 190 and/or by the browser 112, such as device make, model, type, etc., browser type and/or version, operating system type and/or version, etc. Generally speaking, the Device ID may comprise at least portions of one or more physical, logical, and/or temporal identifiers associated with the PED 190, or the Device ID may be generated by applying an algorithm to one or more physical, logical, and/or temporal identifiers associated with the PED 190, e.g., to limit a total number of bits and/or to provide additional security.

At any rate, the token that is generated based on the User ID and the Device ID may be encrypted, e.g. by utilizing AES (Advanced Encryption Standard)-128, -192, or -256, hash function, and/or any other suitable encryption technique. The token as a whole may be encrypted, and/or each of the User ID and the Device ID (or respective indicators thereof) may be individually encrypted using the same or different encryption techniques.

At a block 322, the generated token may be stored in a memory of the PED 190, e.g., in the program memory 200, the RAM 205, the data storage 215, in conjunction with or by the browser 112, etc. Additionally, at a block 325, an indication of the affirmative user preference for automatic log-in and authentication may be stored in conjunction with the user profile in the user profile data store 135 and, although not illustrated in FIG. 2, an indication of the Device ID of the PED 190 may also be stored in conjunction with the user profile at the user profile data store 135. The user may be navigated to his or her target destination (block 315).

As such, in view of the above, the user has been manually logged in and/or authenticated to one or more portions of the enterprise's website 100 via the browser 112 executing at the PED 190 (e.g., blocks 305-310), the user has indicated his or her preference to opt-in or activate automatic log-in and authentication at the PED 190 (e.g., block 312), and data so indicating is generated and/or stored both at the PED 190 and in the back-end system 102 (e.g., blocks 320-325), thus establishing or turning on the automatic log-in and authentication feature for the user at the website 110 via the PED 190 operated by the user.

Figure 3:
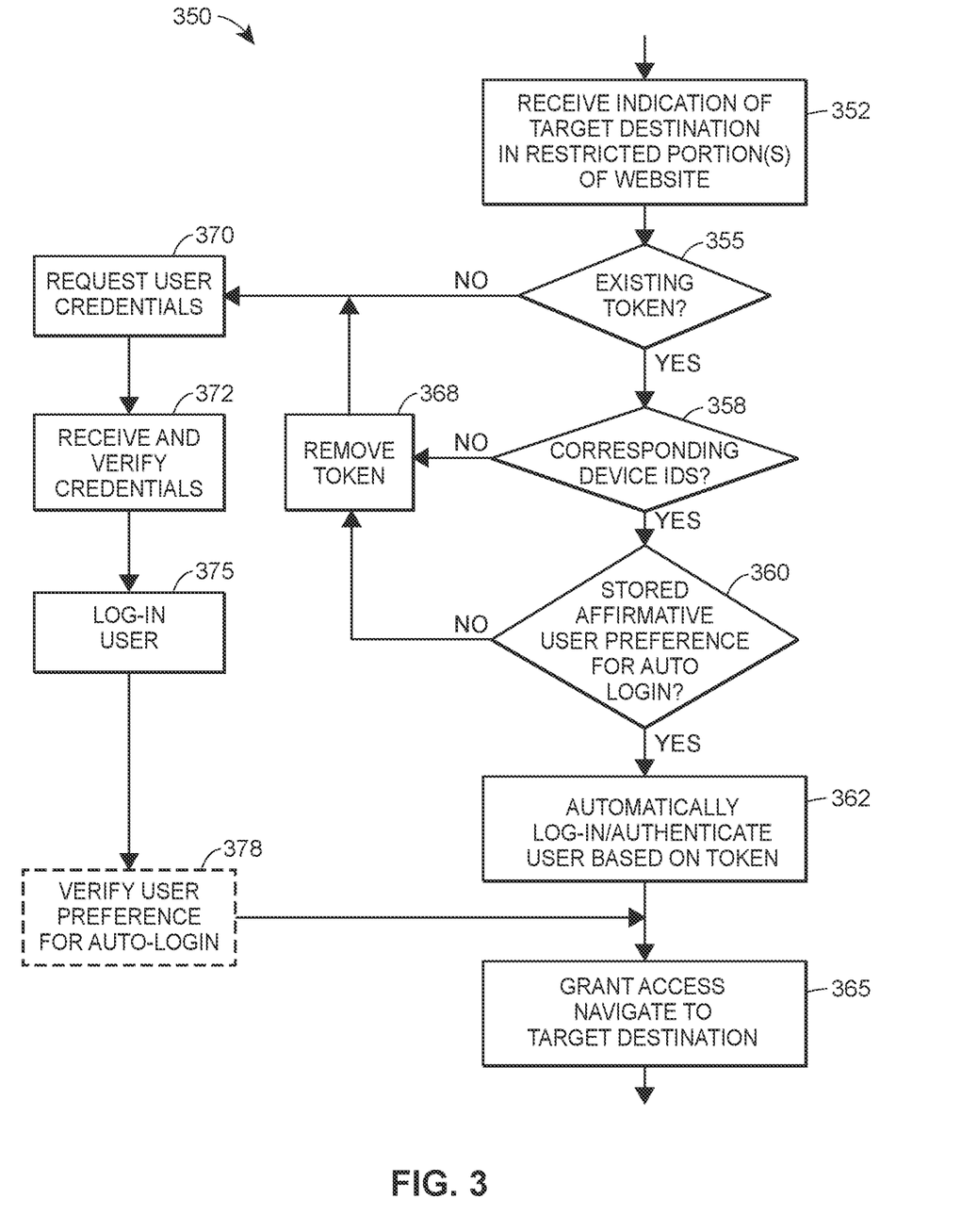
FIG. 3 illustrates a flow chart of an example method for automatically logging in and/or authenticating a user to a website or to restricted portion(s) thereof.

FIG. 3 depicts a flow chart of an example method 350 for automatically logging in and/or authenticating a user to a website or to one or more restricted portion(s) included therein. The method 350 may operate in conjunction with embodiments of the system 100 of FIG. 1A and any one or more components related thereto, such as the central processing system 105, the server 108, the databases 128, the personal electronic device 115 or 190, etc., and/or may operate in conjunction with other systems, processors, databases, and/or devices. For ease of discussion, though, and not for limitation purposes, the method 350 is discussed with simultaneous reference to FIGS. 1A-1C. In some embodiments, the method 350 may execute in conjunction with embodiments of the method 300 of FIG. 2. For example, the method 350 may execute after one or more blocks of the method 300 have been executed.

At a block 352, the method 350 may include receiving an indication that a user of a PED desires to navigate, via a browser, to a portion of a website that is restricted or that requires the user to log in and be authenticated prior to accessing the target destination. For example, the user of the PED 190 may desire to navigate, via a browser 112, to a restricted destination of the website 110, which may be a particular portion of the website 110, or may be the entire website 110.

At a block 355, the method 350 may include determining whether or not a token corresponding to the user's activation of the automatic log-in/authentication feature for the PED 190 is stored at or exists at the user's PED 190, e.g., in a memory of the PED 190 such as the program memory 200, the RAM 205, data storage 215, a portion of memory managed by the browser 112 (e.g., a cookie or similar), or other on-board memory of the PED 190.

If such a token does exist (e.g., the "yes" leg of the block 355), the method 350 may include verifying the information included in or otherwise indicated by or included in stored token (e.g., the User ID and/or the Device ID). For example, at a block 358, the method 350 may include determining whether or not the Device ID indicated by the stored token matches, corresponds to, or is in accordance with the Device ID that is stored in conjunction with a respective user profile stored in the user profile data store 135. Additionally or alternatively, at the block 358, the method 350 may include determining whether or not the Device ID indicated by the stored token matches, corresponds to, or is in accordance with a Device ID that is stored in another memory of the PED 190, such as the program memory 200, the RAM 205, the data storage 215, a memory area managed by the browser 112 (e.g., a cookie or other suitable memory area), or other on-board memory of the PED 190, etc. For instance, at the block 358, the Device ID indicated by the stored token may be compared to the ESN, IMEI, MEID, the make/model/serial number, and/or another suitable identifier of the physical PED 190, which may be provided by the device manufacturer or otherwise natively stored at the device 190. In some embodiments, the Device ID indicated by the stored token may be additionally or alternatively compared to a logical and/or temporal identifier associated with the PED 190 and stored in another memory of the PED 190, such as a phone number, a UUID, a GUID, a MAC address, an IP (Internet Protocol) address, another type of communication address, an operating system type and/or version, a browser type and/or version, or other suitable logical/temporal identifier.

When the compared Device IDs (e.g., the Device ID indicated by token, the Device ID stored in another memory of the device 190 other than the token, and/or the Device ID indicated by the user's profile at the user profile data store 135) match or otherwise correspond (e.g., the "yes" leg of the block 358), the method 350 may verify or determine whether or not the user has previously expressed an affirmative preference for automatic log-in/authentication, e.g., as indicated by or stored in the respective user profile in the user profile data store 135 (block 360). For example, the method 350 may access the respective user profile stored in the user profile data store 135 based on the user ID to determine the user's preference for automatic log-in/authentication. If the user has expressed an affirmative preference (e.g., the "yes" leg of the block 360), the user may be automatically logged-in and authenticated (block 362), thereby granting/providing the user access to the restricted portion(s) of the website 110 and allowing the user to navigate to the target destination (block 365). For example, the user may be automatically logged-in and authenticated based on the User ID indicated by the token and the credentials that are associated with the User ID and stored in the user's profile at the back-end system 102. As such, unlike the known automatic login techniques in which a user's login/password, credentials, and/or other information are stored at each personal electronic device via which the user accesses the website, at least some of such user authentication and/or identification are securely stored and protected at the back-end system 102 (e.g., in conjunction with a user's profile), thus decreasing the risk of a security breach. Further, unlike the known automatic login techniques, automatic access is provided and validated on a per-user, per-device basis (e.g., two-way or three-way validation), thus providing still an extra layer of security.

Notably, in this scenario in which a valid token is stored at the PED 190 thereby indicating that that the user has previously opted-in to automatic log-in/authentication for the PED 190, the steps 355-362 of the method 350 may be automatically performed without the user's knowledge and without any user input (e.g., without prompting or otherwise requesting the user to provide credentials or any other information). That is, for a user who has previously opted-in to the automatic log-in/authentication feature at the PED 190, upon navigating to a target destination at a restricted portion(s) of the website 110 via the browser 112 (e.g., block 352), the user automatically is logged-in, authenticated, and routed to the target destination (e.g., blocks 355-365) without having to enter or provide any credentials. For example, the user is automatically logged-in/authenticated by validating the information indicated by the stored token with information stored in other memories of the device 190 and/or with information indicated by the respective user profile.

On the other hand, when the compared Device IDs (e.g., the Device ID indicated by token, the Device ID stored in another memory of the device 190 other than the token, and/or the Device ID indicated by the user's profile) do not match or do not otherwise correspond (e.g., the "no" leg of the block 358), or when the user has previously expressed a negative preference for automatic log-in/authentication at the PED 190, for example, as indicated by or stored in the respective user profile the user profile data store 135 (e.g., the "no" leg of the block 360), the method 350 may include removing or deleting the stored token from the PED 190 (block 368). Subsequently, the method 350 may include requesting the user's credentials (block 370), e.g., by presenting one or more fields on the display 192 of the user's PED 190 via which the user may enter his or her credentials (e.g., username, password, passphrase, security question answers, etc.), and/or by directing the user to enter his or her credentials via another interface of the PED 190 (e.g., biometric information via a sensor included on the PED 190). The credentials may be received and authenticated and/or verified (block 372), e.g., by comparing the entered credentials with those stored in the user profile data store 135. Upon successful authentication/verification, the user is logged in and authenticated (block 375) and is able to access the target destination at the restricted portion(s) of the website 110 (block 365).

In some embodiments, in conjunction with the blocks 370-375, the method 350 may include an optional block 378 at which the user's preference for automatic log-in/authentication is obtained or verified. For example, in an embodiment, the block 378 to determine the user's preference for automatic log-in/authentication may include the blocks 312-325 illustrated in FIG. 2. For negative user preferences that are obtained or verified at the block 378, the user may be navigated directly to the target destination (block 365), and the negative user preference may be stored at the user's profile (not shown in FIG. 3). For affirmative user preferences that are obtained or verified at the block 378, the method 350 may include generating a new or updated token, and storing the user's affirmative preference and Device ID corresponding to the new/updated token with the user's profile (not shown in FIG. 3) prior to routing the user to his or her target destination (block 365).

Returning now to the block 355 of FIG. 3, if a token corresponding to automatic log-in authentication does not exist or is not stored at the PED 190 (e.g., the "no" leg of the block 355), the method 350 may request, receive, and verify user credentials (blocks 370, 372), and log-in the user (block 375) based on the verified credentials, thereby providing or granting the user access to his or her target destination at the website 110 (block 365). In some cases, the user's preference for automatic log-in/authentication may be verified (block 378). For example, in an embodiment, the block 378 may include the blocks 312-325 illustrated in FIG. 2.

Figure 4:
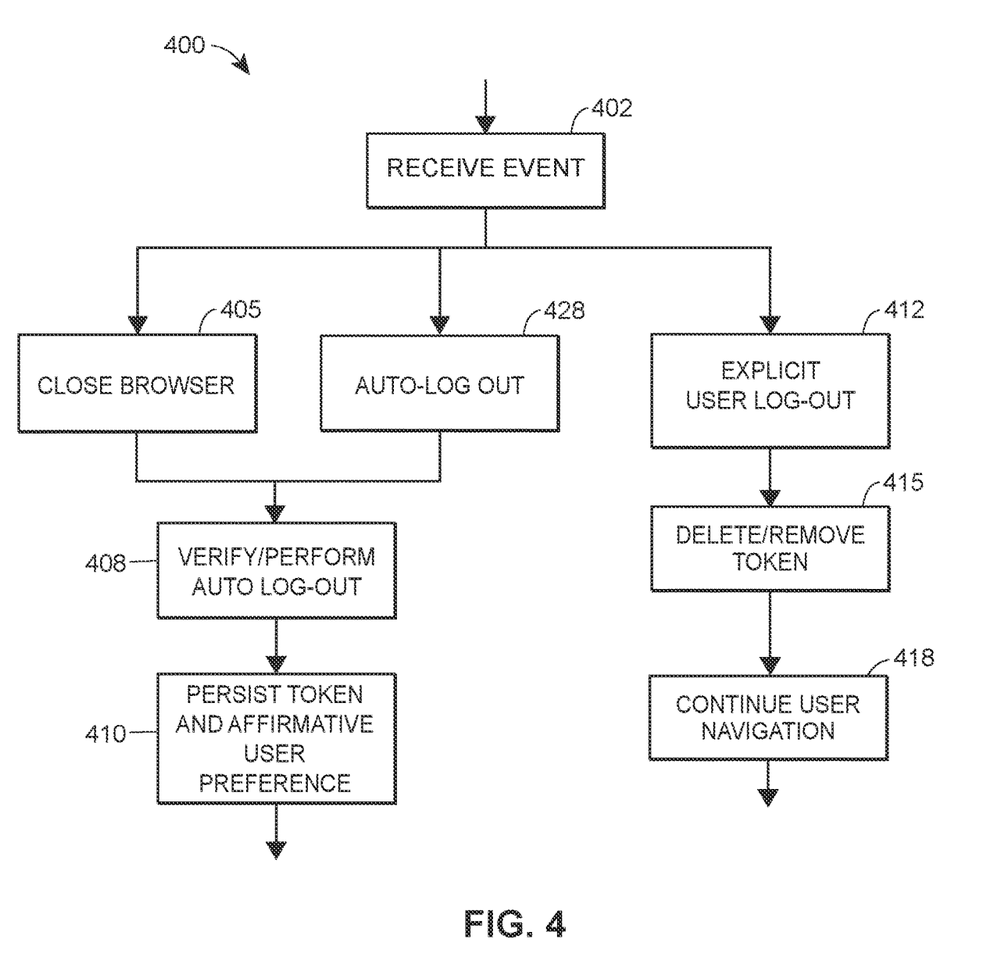
FIG. 4 depicts a flow chart of an example method of managing automatic log-in and/or authentication to a website or to restricted portion(s) thereof.

FIG. 4 depicts a flow chart of an example method 400 of managing automatic log-in and/or authentication of a user to a website, or to one or more restricted portion(s) included therein. The method 400 may operate in conjunction with embodiments of the system 100 of FIG. 1A and any one or more components related thereto, such as the central processing system 105, the server 108, the database(s) 128, the PED 115 or 190, etc., and/or may operate in conjunction with other systems, processors, databases and/or devices. For ease of discussion, though, and not for limitation purposes, the method 300 is discussed with simultaneous reference to FIGS. 1A-1C. Further, the method 400 may execute in conjunction with embodiments of at least a portion of the method 300 of FIG. 2 and/or with embodiments of at least a portion of the method 350 of FIG. 3.

In an example scenario in which the method 400 is utilized, initial conditions may include a user of the PED 190 who has previously indicated a preference for opting in or activating automatic log-in and authentication via the PED 190 to restricted portions of the website 110 (or, in some scenarios, to the entire website 110) that is provided by an enterprise, and who is authenticated and logged-in. For example, the method 400 may execute after the blocks 320-325 of FIG. 2 have executed. As such, a token corresponding to the user's affirmative preference for automatic log-in and authentication may be stored at the user's PED 190, an indication of the user's affirmative preference for automatic log-in and authentication via the PED 190 may be stored in conjunction with the user profile at the user profile data store 135, and the user may be navigating and interacting with restricted portions of the website 110.

At a block 402, the method 400 may include receiving an event. In some scenarios, received event (block 402) may be an indication that the user has closed the browser 112 without explicitly logging off of the website 110 (block 405). In these scenarios, the method 400 may include automatically logging the user out (block 408) while persisting the token at the user's PED 190 and persisting the user's affirmative preference for automatic log-in/authentication at the device 190 in conjunction with the user's profile (block 410). As such, in these scenarios, as the user is automatically logged out (block 408), and the persistent token may be utilized at a later time to automatically log-in/authenticate the user at the PED 190, such as when the user navigates, e.g., via a newly opened instance of the browser 112, to a restricted portion of the website 110, e.g., in a manner such as described above with respect to FIG. 3.

In other scenarios, the received event (block 402) may be an indication that the user has explicitly logged out of or logged off of the website 110 (block 412). In these scenarios, the method 400 may include deleting or removing the token from the PED 190 (block 415), and continuing with supporting the user's navigation to other websites via the browser 112 (block 418).

In some scenarios, the received event (block 402) may be an indication of an automatic or passive log-out of the user from the website 110 (block 428), that is, the user is logged-out without the user having taken any explicit action to do so. For example, the automatic log-out indication may be an indication that a timeout has occurred (e.g., a designated time interval has elapsed without receiving any user activity at the website 110), and as such the user has been automatically or passively logged out. Other examples of automatic or passive log-out include an indication that the user has performed a reset, e.g., of the feature and/or of the PED 190, or other suitable indications.

At any rate, at a block 408, a verification that the user is indeed logged out may be performed, which may include taking steps to automatically log the user out. Subsequently, the method 400 may proceed to the block 410 to persist/maintain the token stored at the user's PED 190 and to persist/maintain the user's affirmative preference for automatic log-in and authentication stored in conjunction with the user's profile. As such, the persistent token may be utilized at a later time to automatically log-in and authenticate the user, such as when the user again navigates to a restricted portion of the website 110, e.g., in a manner such as described in FIG. 3.

Thus, as illustrated in FIG. 4, the token stored at the user's PED 190 that indicates the user's affirmative preference for automatic log-in and authentication via the PED 190 and that provides user verification credentials for use in automatic log-in and authentication generally may be persisted until the user explicitly or actively logs off or out of the website 110 (or from restricted portions thereof) (block 412). In other scenarios, such as when the user closes the browser without explicitly logging out (block 405), when the user is automatically or passively logged off (block 428), or in other scenarios, both the token and the affirmative user preference may be maintained (e.g., at the device 190 and in conjunction with the user profile, respectively) so that the user may be automatically logged-in and authenticated at a later time when the user navigates to a restricted portion of the website 110, e.g., in a manner such as described with respect to FIG. 3.

Figure 5:
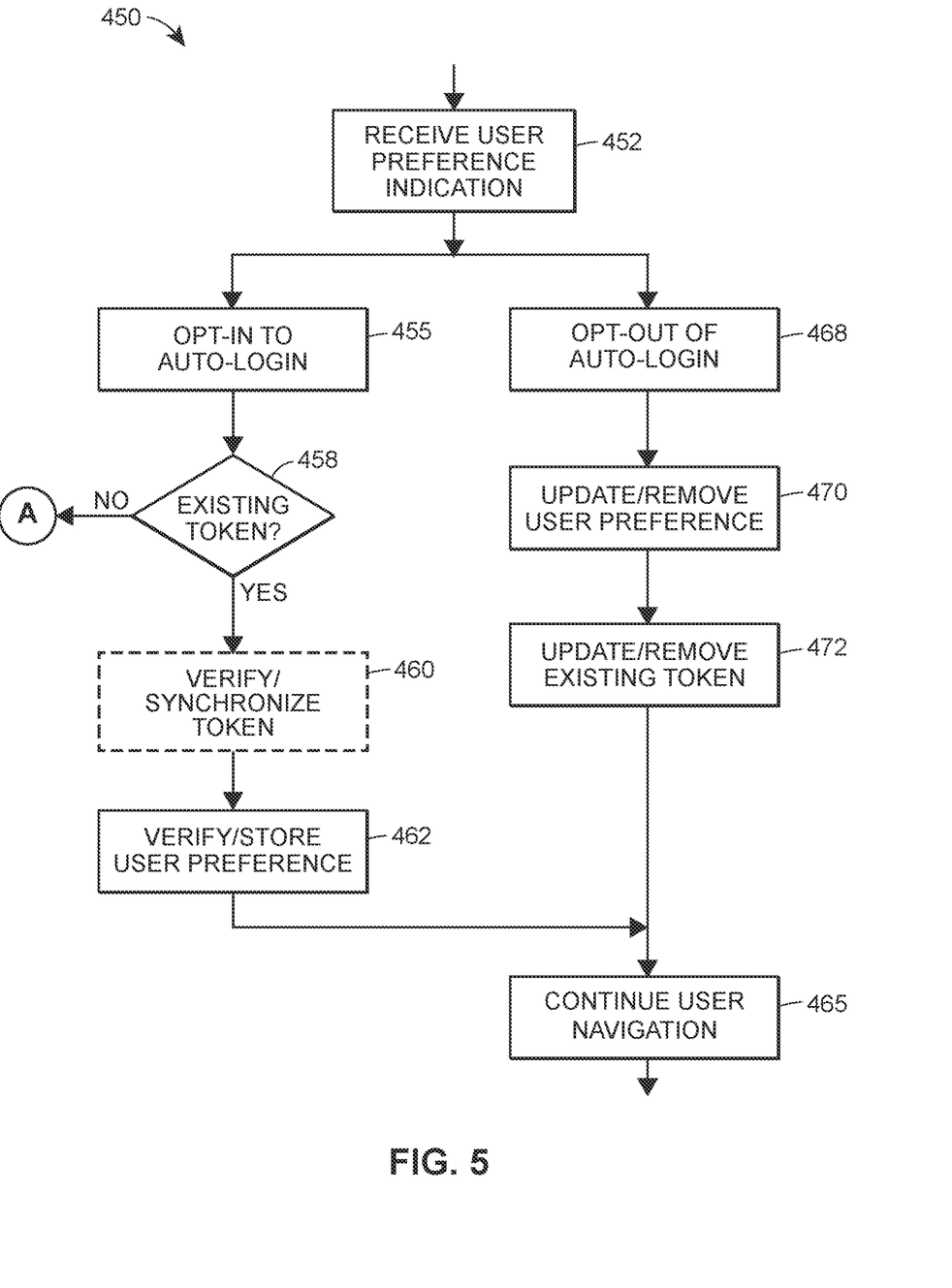
FIG. 5 illustrates a flow chart of an example method for managing the preferences of a user for automatic log-in and/or authentication to a website or to restricted portion(s) thereof.

FIG. 5 depicts a flow chart of an example method 450 for managing the preferences of a user for automatic log-in and/or authentication to a website or to one or more restricted portion(s) included therein. The method 450 may operate in conjunction with embodiments of the system 100 of FIG. 1A and any one or more components related thereto, such as the central processing system 105, the server 108, the database(s) 128, the PED 115 or 190, etc., and/or may operate in conjunction with other systems, processors, databases and/or devices. For ease of discussion, though, and not for limitation purposes, the method 300 is discussed with simultaneous reference to FIGS. 1A-1C. Further, the method 350 may execute in conjunction with embodiments of the method 300 of FIG. 2, the method 350 of FIG. 3, and/or the method 400 of FIG. 4.

As an initial condition to the method 450, a user is navigating as he or she desires to various destinations within the website 110 via a browser 112 executing on a PED 190. At a block 452, an indication of the user's preference regarding automatic log-in and/or authentication with the website 110 is received from the user's PED 190. The indication may be received, for example, from the personal electronic device 190 operated by the user via the communicative connection that is established between the browser 112 executing on the personal electronic device 190 operated by the user and the enterprise website 110 (e.g., via the network 120 and the links 155, 158) at the one or more servers 108 hosting the enterprise website 110, such as in a manner previously discussed above.

When the user preference received from the PED 190 indicates that the user desires to opt-in, turn on, or otherwise activate automatic log-in and authentication, or maintain an existing affirmative preference for automatic log-in and authentication (block 455), the method 450 may include determining whether or not a token corresponding to activation of the automatic log-in/authentication feature is stored at the user's PED 190 (block 458). If such a token does not exist, the method 450 may proceed to block 320 of FIG. 2 (as denoted by the connector "A" in FIGS. 2 and 5) to generate the token, and store various information indicative of the user's affirmative preference for automatic log-in/authentication. On the other hand, if such a token does exist, the method 450 may optionally include verifying the information indicated by the stored token (e.g., User ID and/or Device ID), and synchronizing or updating the information indicated by the stored token upon detecting a discrepancy (block 460). Further, the method 450 may include verifying that the user's affirmative preference for automatic log-in and authentication and the Device ID of the PED 190 is stored in conjunction with the user's profile at the user profile data store 135 (block 462). At any rate, the method 450 may continue with user navigation (block 465), e.g., of the website 110, whether directly from the "yes" leg of block 458, or from the block 458 via the blocks 460 and/or 462.

When the user preference received from the PED 190 indicates that the user desires to opt-out, turn off, or otherwise deactivate automatic log-in and authentication (block 468), or maintain an existing negative preference for automatic-login and authentication, the method 450 may include updating the user's profile stored in the user profile data store 135 to reflect the user's negative preference for automatic log-in and authentication at the PED 190 (block 470). Additionally, in some embodiments, any token corresponding to automatic log-in and authentication that is stored at the user's PED 190 may be deleted or removed (block 472) from the PED 190, and/or the indication of the Device ID of the PED 190 may be deleted or removed from the user's profile. Subsequently, the method 450 may continue with user navigation (block 465) of the website 110.

In view of the above, it is noted that the user's profile stored in user profile data store 135 may maintain, for a particular user, indications of multiple PEDs for which the user has activated the automatic access feature. For example, a user may activate automatic access for his or her personal mobile device, but not for his or her work mobile device. As such, for each of the multiple PEDs for which the user has activated the automatic access feature, a respective Device ID (e.g., the Device ID generated with respect to the block 320 of FIG. 2) may be stored in or otherwise indicated by the user's profile.

Moreover, for additional security, the user may be provided with the ability to turn off automatic access at a particular PED 190 via another device. For example, if the user's PED 190 has been stolen or misplaced, the user may log in to his or her enterprise account via a computer or another PED, and deactivate the automatic access feature for the stolen/misplaced PED 190, thereby reflecting the negative preference for automatic log-in/authentication at the PED 190 within the user's profile. Subsequently, at the PED 190, if an attempt to gain automatic access occurs (e.g., block 352 of FIG. 3), the verification of the user preference (e.g., block 360) would indicate that the feature has been deactivated and user credentials would be explicitly requested (e.g., block 370).

Thus, in view of the above, the novel systems, methods, and techniques disclosed herein provide automatic user log-in and authentication at a website via a browser executing at a user's personal electronic device while addressing security threats that are exposed by known automatic log-in techniques. For example, a user's login/user name and password, credentials, and/or other authentication information need not be stored at each PED that is utilized by the user to access a website, thereby decreasing the chances of the user's authentication information from being compromised. Further, additional verification information provides extra layers of validation, for example, as described above, access granted based on not only based on username/password and/or other credentials, but also on a per-device basis, which may include multiple-way (e.g., two-way or three-way) validation of device identifications. Still further, as a user is automatically logged-in while the user navigates the website and other websites, access is granted on an as-needed basis, thus further decreasing the possibility of rogue access by other parties. Additionally, a user may remotely deactivate the automatic access feature for particular devices, e.g., when a device is stolen or lost, while maintaining automatic access for other devices. These and other benefits and advantages over known techniques are provided by the novel systems, methods, and techniques for secured, automatic user log-in and authentication described herein.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed:

1. A method for automatically providing, to a user using a mobile device, access to a website, the method comprising:
upon receiving, at a system corresponding to a website including a restricted portion, an indication of the user navigating, via the mobile device, to the restricted portion of the website:
when the mobile device stores an access token corresponding to the user and the website and the access token corresponds to (i) a user identifier associated with the user and the website, (ii) a first device identifier that is uniquely indicative of the mobile device and that is stored at the mobile device, and (iii) a user preference for persisting automatic access of the user at the website, automatically providing, by the system, the user access to the restricted portion of the website; and
when the mobile device does not store the access token:
providing, by the system, the user access to the restricted portion of the website when the first device identifier and a second device identifier indicated by a user profile that is associated with the website and that is stored at a back-end system are in accordance; and
requesting the user to log-in in order to access the restricted portion of the website when the first device identifier and the second device identifier are not in accordance.

2. The method of claim 1, wherein:
the mobile device stores the access token;
automatically providing the user access to the restricted portion of the website includes automatically logging in the user at the website; and
the method further comprises deleting the access token from the mobile device upon the user explicitly logging off of the website.

3. The method of claim 2, further comprising:
upon the user closing a browser at the mobile device via which the user navigated to the restricted portion of the website without the user explicitly logging off of the website, automatically logging the user off of the website and persisting the access token stored at the mobile device.

4. The method of claim 1, wherein the mobile device stores the access token, and the method further comprises deleting the access token from the mobile device responsive to at least one of:
(i) a determination that the first device identifier does not correspond to the second device identifier,
(ii) a reception of an updated user preference for not persisting automatic access of the user at the website; or
(iii) a determination that the user has explicitly logged off of the website.

5. The method of claim 1, wherein the access token is automatically generated responsive to obtaining the user preference for persisting the automatic access of the user at the website.

6. The method of claim 5, wherein at least a portion of the access token is encrypted.

7. The method of claim 1, wherein the restricted portion of the website corresponds to at least one of: account information of the user, contents of the user profile, prescription information corresponding to the user, or payment information corresponding to the user.

8. A system for automatically providing, to a user using a mobile device, access to a website, comprising:
computer-executable instructions that are stored on one or more memories of the mobile device and that, when executed by one or more processors of the mobile device, cause the mobile device to, upon receiving an indication of the user navigating, via the mobile device, to a restricted portion of the website:
when the mobile device stores an access token corresponding to the user and the website, and the access token corresponds to (i) a user identifier associated with the user and the website, (ii) a first device identifier that is uniquely indicative of the mobile device and that is stored at the mobile device, and (iii) a user preference for persisting automatic access of the user at the website, automatically provide the user access to the restricted portion of the website; and
when the mobile device does not store the access token corresponding to the user and the website:
provide the user access to the restricted portion of the website when the first device identifier and a second device identifier indicated by a user profile that is associated with the website and that is stored at a back-end system are in accordance; and
request the user to log-in in order to access the restricted portion of the website when the first device identifier and the second device identifier are not in accordance.

9. The system of claim 8, wherein the computer-executable instructions are further executable to cause the mobile device to delete the access token from the mobile device when at least one of: (i) the user explicitly logs off of the website, (ii) the first device identifier is determined to not correspond to the second device identifier, or (iii) the user indicates an updated preference for not persisting automatic access of the user at the website.

10. The system of claim 8, wherein the computer-executable instructions are executable to cause the mobile device further to persist the access token stored at the mobile device when at least one of: (i) the user does not explicitly log off of the website before closing a browser via which the user accessed the website at the mobile device, or (ii) the user is passively logged off of the website.

11. The system of claim 8, wherein at least one of the first device identifier or the second device identifier corresponds to at least one of: an IMEI of the mobile device, a UUID corresponding to the user, a GUID corresponding to the user, a phone number corresponding to the mobile device, a MAC address indicative of the mobile device, an IP address indicative of the mobile device, another indicator of a communicative connection established between a browser executing at the mobile device and the website, a type and/or version of an operating system operating on the mobile device, a type and/or version of the browser, or other data stored by the browser.

12. The system of claim 8, wherein the restricted portion of the website corresponds to at least one of: account information of the user, contents of the user profile, prescription information corresponding to the user, or payment information corresponding to the user.

13. The system of claim 9, wherein the access token is stored in conjunction with a browser at the mobile device.

14. The system of claim 8, wherein the computer-executable instructions are executable to cause the mobile device further to automatically generate the access token upon obtaining the user preference for persisting automatic access of the user at the website.

15. The system of claim 8, wherein at least a portion of the access token is encrypted.

16. A method for automatically providing, to a user operating a mobile device, access to a restricted portion of a website of an enterprise, the method comprising:

receiving an indication of the user navigating, via the mobile device, to a restricted portion of a website;

responsive to receiving the indication of the user navigating to the restricted portion of the website, automatically providing the user access to the restricted portion of the website when:

the mobile device stores an access token corresponding to (i) a user identifier associated with the user and the website, (ii) a first device identifier uniquely indicative of the mobile device and stored at the mobile device, and (iii) a user preference for persisting automatic access of the user at the website; or the first device identifier and a second device identifier indicated by a user profile indicating one or more user access credentials corresponding to the website are in accordance; and responsive to receiving the indication of the user navigating to the restricted portion of the website, requesting the user to log-in in order to access the restricted portion of the website when the mobile device does not store the access token and the first device identifier and the second device identifier are not in accordance.

17. The method of claim 16, further comprising:

automatically generating the access token based on the first device identifier responsive to obtaining the user preference for persisting the automatic access of the user at the website; and deleting the access token from the mobile device responsive to at least one of:
  (i) a determination that the first device identifier does not correspond to the second device identifier;
  (ii) an updated user preference for not persisting automatic access of the user at the website; or
  (iii) a determination that the user has explicitly logged off of the website.

18. The method of claim 17, further comprising persisting the access token stored at the mobile device when at least one of: (i) the user does not explicitly log off of the website before closing a browser via which the user accessed the website at the mobile device, or (ii) the user is passively logged off of the website.

19. The method of claim 16, wherein at least one of the first device identifier or the second device identifier corresponds to at least one of: an IMEI of the mobile device, a UUID corresponding to the user, a GUID corresponding to the user, a phone number corresponding to the mobile device, a MAC address indicative of the mobile device, an IP address indicative of the mobile device, another indicator of a communicative connection established between a browser executing at the mobile device and the website, a type and/or version of an operating system operating on the mobile device, a type and/or version of the browser, or other data stored by the browser.

20. The method of claim 16, wherein the restricted portion of the website corresponds to at least one of: account information of the user, contents of the user profile, prescription information corresponding to the user, or payment information corresponding to the user.

\* \* \* \* \*